(12) United States Patent
Wassmer et al.

(10) Patent No.: US 10,632,660 B2
(45) Date of Patent: Apr. 28, 2020

(54) METHOD TO IMPROVE OPTICAL PROPERTIES OF STABILIZED POLYCARBONATE COMPOSITIONS

(71) Applicant: SABIC Global Technologies B.V., Bergen op Zoom (NL)

(72) Inventors: Kevin Wassmer, Poseyville, IN (US); Franklin Ehrensbeck, Evansville, IN (US); Robert Russell Gallucci, Mt. Vernon, IN (US); William E. Hollar, Jr., Mt. Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 231 days.

(21) Appl. No.: 15/867,849

(22) Filed: Jan. 11, 2018

(65) Prior Publication Data

US 2018/0194053 A1    Jul. 12, 2018

(30) Foreign Application Priority Data

Jan. 12, 2017    (EP) .................................... 17151140

(51) Int. Cl.
*B29C 48/00* (2019.01)
*B29C 45/00* (2006.01)
(Continued)

(52) U.S. Cl.
CPC .............. *B29C 48/05* (2019.02); *B29B 7/007* (2013.01); *B29B 7/88* (2013.01); *B29B 9/06* (2013.01);
(Continued)

(58) Field of Classification Search
CPC . B29C 48/05; B29C 48/0013; B29C 48/0022; B29C 48/793; B29C 48/911;
(Continued)

(56) References Cited

U.S. PATENT DOCUMENTS

| 7,323,535 B2 | 1/2008 | Berkstresser, IV et al. |
| 7,999,041 B2 | 8/2011 | Goossens et al. |

(Continued)

FOREIGN PATENT DOCUMENTS

| CN | 102731985 B | 4/2014 |
| CN | 103724972 A | 4/2014 |

(Continued)

OTHER PUBLICATIONS

European Search Report for European Application No. 18151261.7, Date of Completion of Search: Mar. 8, 2018; dated Mar. 20, 2018; 7 Pages.

(Continued)

*Primary Examiner* — Mathieu D Vargot
(74) *Attorney, Agent, or Firm* — Cantor Colburn LLP

(57) ABSTRACT

Methods for producing transparent polycarbonate articles include melting a composition at a temperature of 300 to 390° C., extruding the melted composition to form a strand, cooling the strand of extruded composition, cutting the cooled strand into pellets, drying the pellets at a temperature of 50 to 140° C. and injecting molding or extruding the pellets at a temperature of 300 to 380° C. to form an article. The composition can comprise a moisture content of 0.1 to 5 wt. % and a crystalline additive having a melting point of at least 280° C., a heat of fusion greater than or equal to 1.0 Joule/gram (J/g). The composition can be cooled to at least 20° C. below the glass transition temperature of the polycarbonate.

18 Claims, 1 Drawing Sheet

(51) Int. Cl.
- *B29C 48/05* (2019.01)
- *B29C 33/62* (2006.01)
- *C08L 69/00* (2006.01)
- *C08K 5/00* (2006.01)
- *C08K 5/3475* (2006.01)
- *C08K 5/357* (2006.01)
- *B29C 48/793* (2019.01)
- *B29C 48/88* (2019.01)
- *C08J 3/12* (2006.01)
- *G02B 1/04* (2006.01)
- *B29B 9/16* (2006.01)
- *B29B 7/88* (2006.01)
- *B29B 7/00* (2006.01)
- *B29B 9/06* (2006.01)
- *B29L 11/00* (2006.01)
- *B29K 69/00* (2006.01)
- *B29B 7/46* (2006.01)

(52) U.S. Cl.
CPC .............. *B29B 9/16* (2013.01); *B29C 33/62* (2013.01); *B29C 45/0001* (2013.01); *B29C 48/0013* (2019.02); *B29C 48/0022* (2019.02); *B29C 48/793* (2019.02); *B29C 48/911* (2019.02); *C08J 3/12* (2013.01); *C08K 5/005* (2013.01); *C08K 5/0041* (2013.01); *C08K 5/3475* (2013.01); *C08K 5/357* (2013.01); *C08L 69/00* (2013.01); *G02B 1/04* (2013.01); *G02B 1/041* (2013.01); *B29B 7/46* (2013.01); *B29C 2948/92209* (2019.02); *B29C 2948/92247* (2019.02); *B29K 2069/00* (2013.01); *B29L 2011/0016* (2013.01); *C08J 2369/00* (2013.01); *C08L 2201/10* (2013.01)

(58) Field of Classification Search
CPC ............ B29C 47/0014; B29C 47/0066; B29C 47/786; B29C 47/8815; B29C 47/0045; B29C 45/0001; B29C 33/62
See application file for complete search history.

(56) References Cited

U.S. PATENT DOCUMENTS

| | | |
|---|---|---|
| 2006/0264581 A1 | 11/2006 | Berkstresser, IV et al. |
| 2007/0290172 A1 | 12/2007 | Momose et al. |
| 2015/0299460 A1* | 10/2015 | Vollenberg ............ C08K 3/013 428/220 |
| 2015/0318450 A1 | 11/2015 | De Brouwer et al. |

FOREIGN PATENT DOCUMENTS

| | | |
|---|---|---|
| CN | 103772940 A | 5/2014 |
| JP | 2004-345123 | * 12/2004 |
| JP | 2014080603 A | 5/2014 |
| WO | 2012074125 A1 | 6/2012 |
| WO | 2012134837 A1 | 10/2012 |
| WO | 2014031730 A1 | 2/2014 |

OTHER PUBLICATIONS

European Search Report for European Application No. 17151140.5, dated Jun. 30, 2017, Date Received: Jul. 28, 2017, 3 Pages.

* cited by examiner

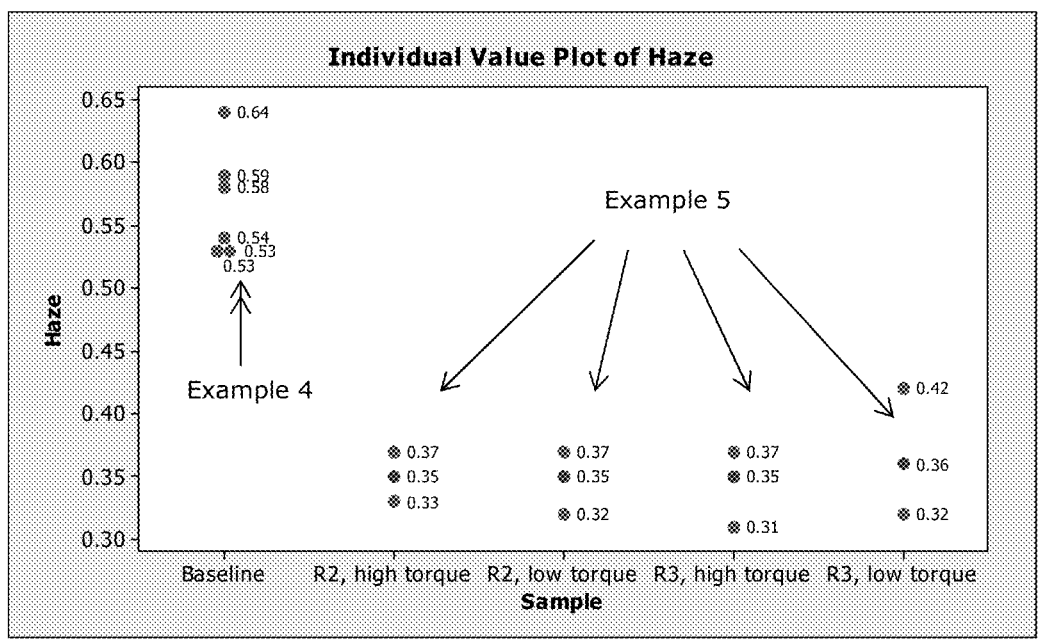

US 10,632,660 B2

METHOD TO IMPROVE OPTICAL PROPERTIES OF STABILIZED POLYCARBONATE COMPOSITIONS

BACKGROUND

This disclosure relates to polycarbonate compositions, and in particular to stabilized polycarbonate compositions with improved optical properties, methods of manufacture, and uses thereof.

Polycarbonates are useful in the manufacture of articles and components for a wide range of applications, from automotive parts to electronic appliances, to light. Because of their broad use, particularly in corrective lenses, it is desirable to provide stable polycarbonates with high transparency and low haze.

The efficient production of transparent polycarbonate compositions containing high melting point crystalline additives granules, for example UV stabilizers with a melting point above 280° C. can be problematic due to the high haze of the resultant article.

Further, well controlled feeding of small amounts of fine powders into an extruder is often difficult due to dust formation and uneven metering. It is known to those having ordinary skill in the art that compacting the powder into a coarser granule is a solution. However, this poses problems when the additive is a crystalline solid with a melting point above 280° C.

Thus, there is a need for a method for efficient production of transparent polycarbonate compositions containing high melting crystalline additive aggregates.

SUMMARY

Disclosed, in various embodiments, are methods for producing transparent polycarbonate articles, and the articles made therefrom.

In one embodiment, the method can comprise melting a composition at a temperature of 300 to 390° C., extruding the melted composition to form a strand, cooling the strand of extruded composition, cutting the cooled strand into pellets, drying the pellets at a temperature of 50 to 140° C. and processing the pellets at a temperature of 300 to 380° C. to form an article. The composition can comprise: a polycarbonate mixture having a weight average molecular weight of 15,000 to 80,000 and a moisture content of 0.1 to 5 wt. %; and a crystalline additive having a melting point of at least 280° C., a heat of fusion greater than or equal to 1.0 Joule/gram (J/g) and an average diameter less than 0.5 millimeters (mm).

These and other features and characteristics are more particularly described below.

BRIEF DESCRIPTION OF THE DRAWINGS

The following is a brief description of the drawing.
FIG. 1 is a plot showing haze of a polycarbonate article including different UV absorbers.

DETAILED DESCRIPTION

Not to be limited by theory, it has been discovered that the exact form of the crystalline organic compound (additive) and the conditions of melt extrusion and molding affect the ability to achieving low haze in a polycarbonate composition.

Disclosed herein is a melt compounding process employing a specific set of conditions and ingredients to produce a composition with low haze and stability. The composition comprises a crystalline additive and a polycarbonate, which can be extruded and further processed into a transparent article. The composition can further include additional elements. Following extrusion, the composition can be cooled, formed into pellets, and dried following extrusion.

The crystalline additive can have a melting point of 280 to 350° C. Additives with very high melting points, for example, over 350° C., will act as a filler giving high haze, if the polycarbonate resin temperature is increased to melt such an additive, the resin is subject to decomposition and color change such as yellowing. Low melting additives, for example, additives melting at 200° C., will be easily dispersed in the molten PC independent of any restriction on particle size or crystalline properties. Crystalline additives with a melting temperature ($T_m$) of about 280 to 320° C. produce the desired product. The crystalline additive can have a heat of fusion greater than or equal to 1.0 Joules/gram (J/g), for example, greater than or equal to 20.0 J/g, or greater than or equal to 50.0 J/g, as determined by differential scanning calorimetry as per ASTM D3418-15. For example, the additive heat of fusion can be from 20 to 150 J/g, or 50 to 100 J/g. The crystalline additive can have a molecular weight from 300 to 3000, preferably 300 to 1500, as determined by the additive chemical formula. The crystalline additive can have an aspect ratio from 1/1 to 1/10 (length versus thickness), for example, 1/2 to 1/5. The average particle size distribution of the crystalline additive can be 0.05 to 0.5 millimeters (mm), for example, 0.1 to 0.3 mm, or 0.2 to 0.5 mm. Desirably, no particles of the crystalline additive have a major axis (i.e. largest dimension) above 1.0 mm. The particle sizes were measured by optical microscopy. Large crystals, even if just a portion of the additive size distribution, will be harder to melt in an extrusion process, resulting in poor dispersion and potential recrystallization and may give haze or other optical imperfections. Large high melting crystals may be carried along with the melting polymer during extrusion, seeing less shear, lower heat and remaining as a haze causing solid. The crystalline additive can be fast crystallizing, for example additive crystallization being essentially complete within one minute with cooling at –40° C./min, further having a crystallization temperature ($T_c$) greater than or equal to 250° C. In some instances the $T_c$ range will be from 50 to 15° C. below the $T_m$ for example from 230 to 335° C.

The crystalline additive can comprise at least one of benzoxazinones, benzotriazoles, colorants, phosphorus containing anti-oxidants; for example, at least one of benzoxazinones and benzotriazoles. The crystalline additive can comprise a phosphorus containing anti-oxidant. The composition can be free of hindered amine light stabilizers (HALS). An example of a possible crystalline additive is CAS 30653-05-5=Mixxim BB-200=Bis-[2-hydroxy-5-methyl-3-(benzotriazol-2-yl)-phenyl]-methane, wherein the molecular weight is 462 and the melting point is 285° C. Another example of a crystalline additive is CAS 18600-59-4, =2,2'-(1,4-phenylene)bis-4H-3,1-benzoxazin-4-one)= Cyasorb UV-3638 (sodium less than 50 ppm), wherein the molecular weight is 368, the melting point is 317° C. and crystallization temperature is 292° C. Colorants include at least one of perinones, anthroquinones, and phthalocyanines dyes. For example, the colorant can comprise a perinone colorant, such as Solvent Red 135, which has a melting point of 318° C. For example, the colorant can comprise an anthroquinone, such as Solvent Red 52, which has melting point of 280° C. The crystalline additive can be added in an amount from 0.01 to 10.0 wt %, preferably 0.2 to 1.5 wt %, or 0.1 to 0.8 wt %, based on the total weight of the composition. More than 10 wt % of the crystalline additive can lower the glass transition temperature (Tg) and reduce impact.

"Polycarbonate" as used herein means a polymer having repeating structural carbonate units of formula (1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. W can be derived from an aromatic dihydroxy compound of the formula HO—$R^1$—OH, in particular of formula (2)

$$HO\text{-}A^1\text{-}Y^1\text{-}A^2\text{-}OH \quad (2)$$

wherein each of $A^1$ and $A^2$ is a monocyclic divalent aromatic group and $Y^1$ is a single bond or a bridging group having one or more atoms that separate $A^1$ from $A^2$. In an embodiment, one atom separates $A^1$ from $A^2$. Specifically, each $R^1$ can be derived from a bisphenol of formula (3)

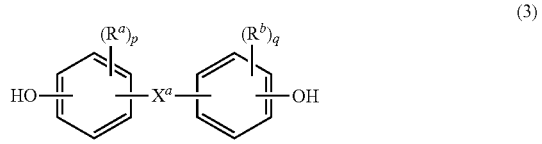

wherein $R^a$ and $R^b$ are each independently a halogen, $C_{1-12}$ alkoxy, or $C_{1-12}$ alkyl, and p and q are each independently integers of 0 to 4. It will be understood that when p or q is less than 4, the valence of each carbon of the ring is filled by hydrogen. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-1}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group. For example, the polycarbonate can include phenolic end groups less than 50 ppm, and chlorine (Cl) and Bromine (Br) less than 100 ppm.

In an embodiment, $X^a$ is a $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of these types include methylene, cyclohexylmethylidene, ethylidene, neopentylidene, and isopropylidene, as well as 2-[2.2.1]-bicycloheptylidene, cyclohexylidene, 3,3-dimethyl-5-methylcyclohexylidene, cyclopentylidene, cyclododecylidene, and adamantylidene.

In another embodiment, $X^a$ is a $C_{1-18}$ alkylene, a $C_{3-18}$ cycloalkylene, a fused $C_{6-18}$ cycloalkylene, or a group of the formula -$J^1$-G-$J^2$- wherein $J^1$ and $J^2$ are the same or different $C_{1-6}$ alkylene and G is a $C_{3-12}$ cycloalkylidene or a $C_{6-16}$ arylene.

For example, $X^a$ can be a substituted $C_{3-18}$ cycloalkylidene of formula (4)

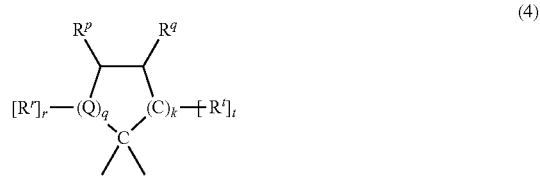

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl, or $C_{1-12}$ acyl; r is 0 to 2, t is 1 or 2, q is 0 or 1, and k is 0 to 3, with the proviso that at least two of $R^r$, $R^P$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and q is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^P$ can be a double-bonded oxygen atom, i.e., a ketone, or Q can be —N(Z)— wherein Z is phenyl.

Bisphenols wherein $X^a$ is a cycloalkylidene of formula (4) can be used in the manufacture of polycarbonates containing phthalimidine carbonate units of formula (1a)

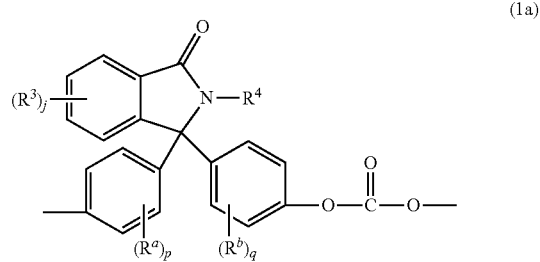

wherein $R^a$, $R^b$, p, and q are as in formula (3), $R^3$ is each independently a $C_{1-6}$ alkyl, j is 0 to 4, and $R_4$ is hydrogen, $C_{1-6}$ alkyl, or a substituted or unsubstituted phenyl, for example, a phenyl substituted with up to five $C_{1-6}$ alkyls. For example, the phthalimidine carbonate units are of formula (1b)

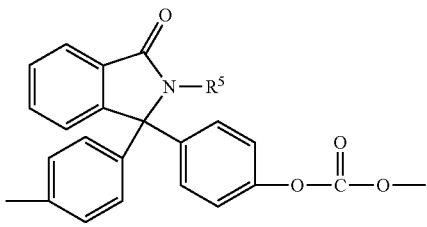

(1b)

wherein $R^5$ is hydrogen, phenyl optionally substituted with up to five 5 $C_{1-6}$ alkyls, or $C_{1-4}$ alkyl. In an embodiment in formula (1b), $R^5$ is hydrogen, methyl, or phenyl, specifically phenyl. Carbonate units (1b) wherein $R^5$ is phenyl can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

Other bisphenol carbonate repeating units of this type are the isatin carbonate units of formula (1c) and (1d)

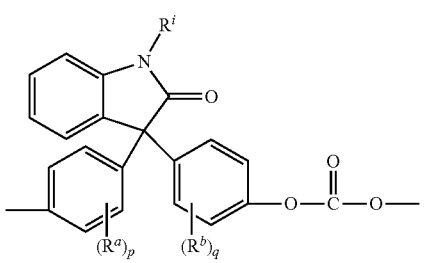

(1c)

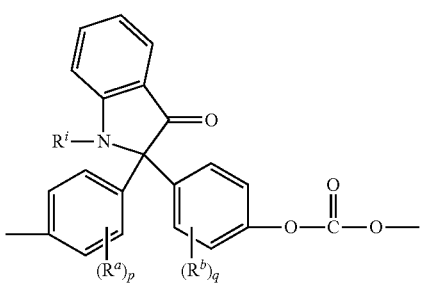

(1d)

wherein $R^a$ and $R^b$ are each independently a halogen, $C_{1-12}$ alkoxy, or $C_{1-12}$ alkyl, p and q are each independently 0 to 4, and $R^i$ is $C_{1-12}$ alkyl, phenyl optionally substituted with 1 to 5 $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{1-4}$ alkyl or phenyl.

Other examples of bisphenol carbonate units derived from of bisphenols (3) wherein $X^a$ is a substituted or unsubstituted $C_{3-18}$ cycloalkylidene include the cyclohexylidene-bridged bisphenol of formula (1e)

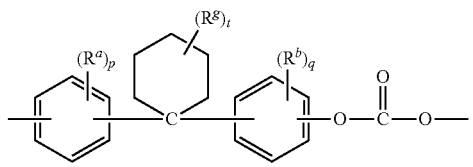

(1e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, p and q are each 0 or 1, and t is 0 or 3, specifically 0. In still another embodiment, p and q are each 0, each $R^g$ is methyl, and t is 3, such that $X^a$ is 3,3-dimethyl-5-methyl cyclohexylidene.

Examples of other bisphenol carbonate units derived from bisphenol (3) wherein $X^a$ is a substituted or unsubstituted $C_{3-18}$ cycloalkylidene include adamantyl units of formula (1f) and fluorenyl units of formula (1g)

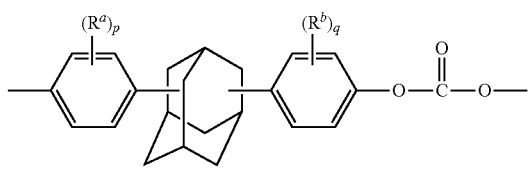

(1f)

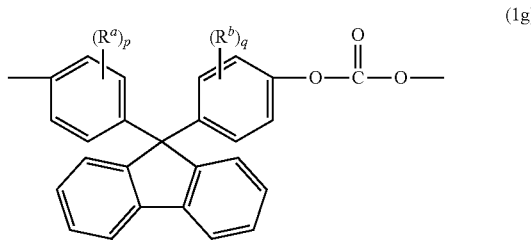

(1g)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1; specifically, $R^a$, $R^b$ are each methyl, p and q are each 0 or 1, and when p and q are 1, the methyl group is disposed meta to the cycloalkylidene bridging group. Carbonates containing units (1a) to (1g) are useful for making polycarbonates with high glass transition temperatures (Tg) and high heat distortion temperatures.

Other useful dihydroxy compounds of the formula HO—$R^1$—OH include aromatic dihydroxy compounds of formula (6)

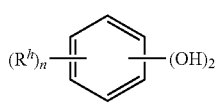

(6)

wherein each $R^h$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. The halogen is usually bromine.

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis (4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In a specific embodiment, the polycarbonate is a linear homopolymer derived from bisphenol A, in which each of $A^1$ and $A^2$ is p-phenylene and $Y^1$ is isopropylidene in formula (3).

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight (Mw) of 10,000 to 200,000 Daltons, specifically 20,000 to 100,000 Daltons, or 15,000 to 80,000 Daltons, as measured by gel permeation chromatography (GPC), using a cross-linked styrene-divinylbenzene column and calibrated to bisphenol A homopolycarbonate references. GPC samples are prepared at a concentration of 1 mg per ml, and are eluted at a flow rate of 1.5 ml per minute.

"Polycarbonates" includes homopolycarbonates (wherein each $R^1$ in the polymer is the same), copolymers comprising different $R^1$ moieties in the carbonate ("copolycarbonates"), and copolymers comprising carbonate units and other types of polymer units, such as ester units or siloxane units.

The polycarbonate can include polycarbonate copolymers. A specific type of copolymer is a poly(ester-carbonate), also known as a polyester-polycarbonate. Such copolymers further contain, in addition to recurring carbonate units of formula (1), repeating units of formula (7)

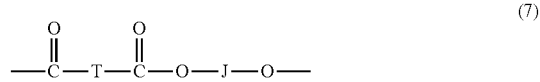

(7)

wherein J is a divalent group derived from a dihydroxy compound (including a reactive derivative thereof), and can be, for example, a $C_{2-10}$ alkylene, a $C_{6-20}$ cycloalkylene, a $C_{6-20}$ arylene, or a polyoxyalkylene in which the alkylene groups contain 2 to 6 carbon atoms, specifically 2, 3, or 4 carbon atoms; and T is a divalent group derived from a dicarboxylic acid (including a reactive derivative thereof), and can be, for example, a $C_{2-20}$ alkylene, a $C_{6-20}$ cycloalkylene, or a $C_{6-20}$ arylene. Copolyesters containing a combination of different T or J groups can be used. The polyester units can be branched or linear.

J can be a $C_{2-30}$ alkylene group having a straight chain, branched chain, or cyclic (including polycyclic) structure, for example ethylene, n-propylene, i-proplyene, 1,4-butylene, 1,6-cyclohexylene, or 1,4-methylenecyclohexane. Optionally, J can be derived from a bisphenol of formula (3), e.g., bisphenol A. In another embodiment, J can be derived from an aromatic dihydroxy compound of formula (6), e.g., resorcinol.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98.

Specific ester units include ethylene terephthalate, n-propylene terephthalate, n-butylene terephthalate, 1,4-cyclohexanedimethylene terephthalate, and ester units derived from isophthalic acid, terephthalic acid, and resorcinol (ITR)). The molar ratio of ester units to carbonate units in the copolymers can vary broadly, for example 1:99 to 99:1, specifically 10:90 to 90:10, more specifically 25:75 to 75:25, or 2:98 to 15:85, depending on the desired properties of the final composition. Specific poly(ester-carbonate)s are those including bisphenol A carbonate units and isophthalate-terephthalate-bisphenol A ester units, also commonly referred to as poly(carbonate-ester)s (PCE) poly(phthalate-carbonate)s (PPC) depending on the molar ratio of carbonate units and ester units.

In some instances the polycarbonate, polycarbonate copolymer or transparent blend thereof includes phenolic end groups. The polycarbonate, polycarbonate copolymer or blend can include at least one of: less than 50 parts per million by weight (ppm) of phenolic end groups; less than 100 ppm of Cl; and less than 100 ppm of Br. Desirably, the polycarbonate, polycarbonate copolymer or blend includes less than 50 parts per million by weight (ppm) of phenolic end groups; less than 100 ppm of Cl; and less than 100 ppm of Br.

The composition can further include additional elements. For example, the composition can include a colorant. The colorant can comprise at least one of the following: Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse Violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1 or Solvent Yellow 188. In some instances the colorant will be present from 0.0001 to 2.0 wt % of the composition, e.g., 0.001 to 0.5 wt % based upon a total weight of the composition.

The composition can optionally further comprise a mold release agent. For example, the mold release agent can comprise at least one of $C_6$ to $C_{36}$ pentaerythritol or glycerol esters, poly alpha olefins with a molecular weight of 300 to 1500 Daltons. Release agents can be used alone or in combination from 0.05 to 2.0 wt %, based upon a total weight of the composition. In other instance the release agents (e.g., mold release agent) can be used in an amount of 0.1 to 0.5 wt %, based upon a total weight of the composition. Release agents that can cause haze in polycrabonates, such as high molecular weight olefin waxes, should be avoided. Amide mold release agents, such as ethylene bis-stearamides, can sometimes lead to undesired yellowing when exposed to high temperatures. The alkyl ester mold release agents are preferred. The polycarbonate can be combined with the crystalline additive, e.g., after the polymerization of the polycarbonate, it can be combined with the crystalline additive. The polycarbonate and the crystalline additive can be extruded, e.g., in a single or twin extruder. The polycarbonate can have less than 4% water (e.g., 0.01 to 3 wt. % water) based upon the total weight of the polycarbonate. The polycarbonate can be in a powder or pellet form. The crystalline additive can be included in an amount between 0.01 and 10.0 wt %, based upon the total weight of the polycarbonate composition (i.e., the polycarbonate, crystalline additive, and any other additive or material present). In some instances the high melting crystalline additive will be present at 0.1 to 1.0 wt %. Additional materials can be added to the composition including, for example, colorants and mold release agents, that will not affect the transparency and haze of the article formed from the composition.

The extrusion can occur at 300-390° C., preferably 300-350° C., e.g., at 100 to 1,000 revolutions per minute (rpm), in some instances screw speed will be from 300 to 700 rpm, with vacuum ventilation. The screw length/diameter (L/D) ratio can be from 20:1 to 40:1, and the screw diameter can be from 1 to 20 centimeters (cm). A co-rotating intermeshing twin screw extruder can be used, in some instances to reduce the formation of black specks under longer manufacturing runs.

Following extrusion, the extruded composition can be passed through a die (e.g., a cylindrical die) to form the mixture into a strand (optionally a plurality of strands) and cool the mixture from 20° C. to at least 10° C. below the glass transition temperature ($T_g$) of the polycarbonate. Other cooling methods can also be used to cool the extruded composition, such as strand cooling. For example, the extruded composition can be cooled in a water bath at a pH of 5.5 to 7.0, and optionally using 5 micrometer filtered water.

After cooling, the composition can be chopped into pellets having an average size from 2.0 to 6.0 mm in length, wherein the diameter is from 0.3 to 4.0 mm, wherein the diameter of the pellet is less than the length. Chopping can be achieved by various means, for example, using a strand pelletizer with rotating knife with a supported bed, e.g., those available from the Bay Plastics Machinery Co., Coperion Co. or the like. The pellets are chopped at a temperature at least 20° C. below the polycarbonate glass transition (Tg) temperature.

The pellets can be dried following cooling. For example, the pellets can be dried at 50 to 140° C. for at least one hour. In some instances pellets, will be dried in air for 3 hrs at 125° C.

An article can be created by processing the pellets by, for example, at least one of molding (e.g., injection molding, blow molding, etc), extrusion, thermoforming. For example, the article can be injection molded at 300 to 380° C. The resultant article can have a thickness from 0.5 to 200 mm. The article is formed from a composition, when formed into a 3.2 mm plaque, has a haze of less than or equal to 5%, (e.g., less than or equal to 3%, or less than or equal to 1%). The article is formed from a composition, when formed into a 3.2 mm plaque, has a yellow index of less than or equal to 10, for example, less than or equal to 8, or less than or equal to 5. The article is formed from a composition, when formed into a 3.2 mm plaque, has a percent transmission at 380 nanometers (nm) of less than or equal to 0.5%, and notched izod value of greater than or equal to 5 J/m. As used herein, transmission and haze were measured on a 3.2 mm sample in accordance with ASTM D1003-00 Procedure A with a HAZE-GUARD DUAL from BYK-Gardner, using an integrating sphere (0°/diffuse) geometry, wherein the spectral sensitivity conforms to the CIE standard spectral value under standard lamp D65; notched Izod was measured according to ASTM D256-10 on 3.2 mm thick bars at 23° C. using a 5 lb hammer; and yellowness index (YI) was determined using a HunterLab Color System according to ASTM D1925-70 on plaques, as molded of 3 mm thickness. As used herein, transmission is visible light transmission.

This method results in an article having a lower haze, for example less than 0.5% at 3.2 mm, than a composition made with a different process and comprising an additive having a crystalline melting point above 280° C. and a heat of fusion over 1.0 J/g and an average particle size greater than 1.0 mm.

The following examples are merely illustrative of the methods disclosed herein and are not intended to limit the scope hereof.

EXAMPLES

Test Standards Transmission and haze were measured on a 3.2 mm sample in accordance with ASTM D1003-00 Procedure A with a HAZE-GUARD DUAL from BYK-Gardner, using an integrating sphere (0°/diffuse) geometry, wherein the spectral sensitivity conforms to the CIE standard spectral value under standard lamp D65. Yellowness Index (YI) was determined using a HunterLab Color System according to ASTM D1925-70 on plaques, as molded of 3 mm thickness. Notched Izod is measured according to ASTM D256-10 on 3.2 mm thick bars at 23° C. using a 5 lb hammer. PC molecule weigh is calculated by GPC using polycarbonate standards.

Tg, melting and crystallization temperatures are calculated by differential scanning calorimetry (DSC) as per ASTM D3418-15 using a 20° C. heating rate.

Example 1

A polycarbonate with a Mw of 28,000 Daltons having less than 10 parts per million by weight (ppm) bromine (Br) or Chlorine (Cl), with phenolic end groups below 10 ppm and a moisture content of 0.4 wt % was blended with 0.3 wt. % of a powdered having a particle size of 0.4 mm benzoxazinone UV absorber (2,2'-(1,4-phenylene)bis-4H-3,1-benzoxazin-4-one), 2 ppm solvent blue 60, 2 ppm solvent violet 36, and 600 ppm tris di-tert butyl phenyl phosphite. The benzoxazinone UV absorber had a molecular weight of 368 Daltons, a melting point of 317° C. with a heat of fusion of 82 J/g and crystallized at 292° C. with a heat of crystallization of about 75 J/g. The benzoxazinone UV absorber had a particle size of about 0.4 mm. The polycarbonate was a powder with a bulk density of 11 pounds per cubic foot ($lb/ft^3$).

The mixture was extruded at 310° C. in a co-rotating intermeshing 50 mm twin screw extruder at 550 revolutions per minute (rpm) with 18 inches of mercury (Hg) vacuum. The molten polymer mixture was passed through a circular die and formed into continuous cylindrical strands which were passed through a bath of deionized water that had been filtered to remove particles larger than 5 micrometers and had a pH of 6.0. The polycarbonate had a Tg of 148° C. and the water bath was maintained at a temperature of 40 to 60° C. The strands were dried using an air knife and chopped into pellets, having a diameter of about 3 mm and a length of 6 mm using a strand pelletizer. The pellets were washed to remove any chaff or fines and then dried at about 125° C. and injection molded at 270-300° C. into 3.2 mm plaques. The injection molded 3.2 mm parts had a low haze of only 0.35%, a yellowness index (YI) of 1.2 a % transmission (% T) of 92 and a notched Izod at 23° C. of 10 foot pounds per inch (ft-lbs/in).

Example 2

The moist polycarbonate powder of Example 1 was mixed with 2 ppm solvent blue 60, 2 ppm solvent violet 36 and 600 ppm tris di-tert butyl phenyl phosphite and a benzoxazinone UV absorber as described above, but in this instance the UVA was in the form of a large 2.0 mm granule. The large granule of the high melting UVA was used to reduce dust and loss of the stabilizer.

The mixture was extruded and formed under the same conditions as described above. Surprisingly the plaques showed a percent (%) haze as measured by ASTM D1003-10 of 0.6% at 3.2 mm. The larger particle high melting UVA almost doubled the haze in these articles.

The haze inducing particles were shown by FTIR spectroscopy to be unmelted and undispersed benzoxazinone UV absorber. This was surprising as the melt temperature of the polymer was above the UVA melting point.

As shown in FIG. 1, changes in the extrusion conditions using the large granular UVA did not significantly reduce haze below 0.5%. If higher extrusion temperatures were used the blend showed an undesired increase in yellowness index above 3.0. As opposed to the granule (Example 2) the UVA powder (Example 1) allowed production of low haze, low yellowness polycarbonate parts with no reduction in extrusion rate or loss of optical or mechanical properties.

Example 3

In a further example, the moist polycarbonate powder, colorants and phosphite stabilizer of Example 1 were blended with 0.3 wt % of a benzotriazole UVA, 2-(2'hydroxy-5-T-octaphenyl)-benzotriazole. This benzotriazole UVA was in the form of a low dusting large 2.0 mm granule. The benzotriazole UV absorber had a molecular weight of 225 from formula, a melting point of 127° C. The polycarbonate was a powder with a bulk density of 11 $lb/ft^3$.

The mixture was extruded at 310° C. in a co-rotating intermeshing 50 mm twin screw extruder at 550 rpm. The molten polymer mixture was passed through a circular die and formed into continuous cylindrical strands which were passed through a bath of deionized water that had been filtered to remove particles larger than 5 micrometers and had a pH of 6.0. The polycarbonate had a Tg of 148° C. and the water bath was maintained at a temperature of 40 to 60° C. The strands were dried using an air knife and chopped into pellets having a diameter of about 3 mm and a length of 6 mm. The pellets were washed to remove any chaff or fines, then dried at about 125° C., and injection molded at 270 to 300° C. into 3.2 mm plaques.

As opposed to the use of large granules in Example 2 (which resulted in high haze) the injection molded 3.2 mm parts of the large granule benzotriazole UVA had a low haze of only 0.4%. In this instance the large particle size of the lower melting UVA granule was not related to haze in the polycarbonate part as seen in compounding the higher melting large particle additive. With lower melting (127° C.) crystalline additive like this the size does not matter. This example shows the criticality of the $T_m$ part of our invention.

Example 4

The moist polycarbonate powder of Example 1 was mixed with 2 ppm solvent blue 60, 2 ppm solvent violet 36 and 600 ppm tris di-tert butyl phenyl phosphite, 0.3 wt. % of a powdered benzoxazinone UV absorber (2,2'-(1,4-phenylene)bis-4H-3,1-benzoxazin-4-one) with a particle size of 0.4 mm and 0.27 wt % of a pentaerythritol tetra stearate mold release. The polycarbonate was a powder with a bulk density of 11 $lb/ft^3$.

The mixture was extruded at 310° C. in a co-rotating intermeshing 50 mm twin screw extruder at 550 rpm. The molten polymer mixture was passed through a circular die and formed into continuous cylindrical strands which were passed through a bath of deionized water that had been filtered to remove particles larger than 5 micrometers and had a pH of 6.0. The polycarbonate had a Tg of 148° C. and the water bath was maintained at a temperature of 40 to 60° C. The strands were dried using an air knife and chopped into pellets having a diameter of about 3 mm and a length of 6 mm. The pellets were washed to remove any chaff or fines, then dried at about 125° C., and injection molded at 270 to 300° C. into 3.2 mm plaques. The injection molded 3.2 mm parts had a low haze of only 0.36%, a yellowness index (YI) of 1.6, a % transmission (% T) of 91 and a notched Izod at 23 C of 9 ft-lbs/in.

The method disclosed herein include(s) at least the following embodiments:

Aspect 1: A method for producing a transparent polycarbonate article, the method comprising: melting a composition at a temperature of 300 to 390° C.; extruding the melted composition and forming into a strand; cooling the strand of extruded composition to at least 20° C. below the $T_g$ of the polycarbonate; cutting the cooled strand (which is preferably in the form of a cylindrical body) into pellets of the extruded composition; drying the pellets at a temperature of 50 to 140° C.; and injection molding or extruding the pellets at a temperature of 300 to 380° C. to form an article; preferably wherein the composition has a haze of less than 5% and preferably has a percent transmission above 70 when formed into a an article having a thickness of 3.2 mm, according to ASTM D1003-00. The composition comprises: a polycarbonate mixture including a polycarbonate having a Mw of 15,000 to 80,000 Daltons, a moisture content of 0.1 to 5 wt. %, preferably 0.3 to 5 wt. %, prior to melting, and a $T_g$; and a crystalline additive having a melting point of at least 280° C., a heat of fusion greater than or equal to 1.0 J/g as determined by differential scanning calorimetry in accordance with ASTM D3418-15, and an average diameter less than or equal to 0.5 mm as determined by optical microscopy.

Aspect 2: The method of Aspect 1, wherein the article has a haze of less than 0.5% at 3.2 mm according to ASTM D1003-00.

Aspect 3: The method of any of the preceding aspects, wherein the granular additive has a crystallization temperature (Tc) greater than or equal to (≥) 280° C. and a heat of crystallization greater than or equal to 1.0 J/g as determined by differential scanning calorimetry as per ASTM D3418-15.

Aspect 4: The method of any of the preceding aspects, wherein the composition includes 0.1 to 10 wt. % of the crystalline additive, wherein the crystalline additive comprises a UV absorbing additive comprising at least one of benzoxazinones, benzotriazoles, phosphorus-based antioxidants, preferably at least one of benzoxazinones and benzotriazoles.

Aspect 5: The method of any of the preceding aspects, wherein the crystalline additive comprises a benzoxazinone, benzotriazole or a phosphorus-based antioxidant having a molecular weight from 300 to 1500 Daltons.

Aspect 6: The method of any of the preceding aspects, wherein the composition includes a colorant comprising at least one the following: Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse Violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1 or Solvent Yellow 188.

Aspect 7: The method of any of the preceding aspects, further comprising at least one mold release agent comprising at least one: $C_6$ to $C_{36}$ pentaerythritol, glycerol esters, poly alpha olefins with a molecular weight of 300 to 1500.

Aspect 8: The method of any of the preceding aspects, wherein the extruded composition is cooled with water wherein the cooling water is filtered to less than 5 microns and has a pH 5.5 to 7.0.

Aspect 9: The method of any of the preceding aspects, wherein the polycarbonate includes phenolic end groups, wherein the polycarbonate includes less than 50 ppm of phenolic end groups, wherein the polycarbonate includes less than 100 ppm of Cl, wherein the polycarbonate includes less than 100 ppm of Br.

Aspect 10: The method of any of the preceding aspects, wherein the pellets comprising the polycarbonate and crystalline additive are formed into a transparent sheet, film, lens or optical device.

Aspect 11: A method to make a transparent polycarbonate article with a thickness of from 1 to 10 mm comprising: extruding mixture of 0.1 to 10.0 wt. % of a benzoxazinone, benzotriazole, phosphorus containing anti-oxidant, colorant or any mixtures thereof, at least one of which has a crystalline melting point of greater than or equal to 280° C. and a heat of fusion of greater than or equal to 1.0 J/g and an aggregate average particle size less than 0.5 mm, with 99.8 to 90.0 wt. % of a polycarbonate having a Mw 15,000 to 80,000 Daltons, phenolic end groups content less than 50 ppm, and a moisture content of 0.1 to 5.0 wt. % prior to extrusion in a screw driven melt processing device at 300 to 390° C. wherein the screw is rotating at 250 to 1000 rpm and has a diameter of 20 to 500 mm: passing the mixture through a die (e.g., a circular die), cooling the mixture to at least 20 C below the PC Tg and chopping the exudate into pellets having an average size of from 2.0 to 6.0 mm in length where the diameter of the pellet is less than the length; and drying pellets at 50 to 140° C. for at least 1 hr. and injection molding an article at 300 to 380° C. wherein the article, at a thickness of 3.2 mm, has a yellowness index (YI) less than 10, a percent transmittance above 70 and a haze less than 5% wherein the haze is lower than a similar composition made with a benzoxazinone, benzotriazole, phosphorus containing anti-oxidant, colorant or any mixtures thereof, any of which have a crystalline melting point of greater than or equal to 280° C. and a heat of fusion of greater than or equal to 1.0 J/g and an average particle aggregate size greater than 1.0 mm.

Aspect 12: The use of the composition formed by the method of any of the preceding aspects to form optical lenses.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless otherwise specified herein, any reference to standards, regulations, testing methods and the like, such as ASTM D1003, ASTM D4935, ASTM 1746, FCC part 18, CISPR11, and CISPR 19 refer to the standard, regulation, guidance or method that is most recent at the time of filing of the present application.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for producing a transparent polycarbonate article, the method comprising:
   melting a composition at a temperature of 300 to 390° C., the composition comprising
   a polycarbonate mixture including a polycarbonate having a Mw of 15,000 to 80,000, a moisture content of 0.1 to 5 wt. % prior to melting, and a $T_g$, and
   a crystalline additive having a melting point of at least 280° C., a heat of fusion greater than or equal to 1.0 J/g as determined by differential scanning calorimetry in accordance with ASTM D3418-15, and an average diameter less than or equal to 0.5 mm as determined by optical microscopy;
   extruding the melted composition to form a strand;
   cooling the strand of extruded composition to at least 20° C. below the $T_g$ of the polycarbonate;
   cutting the cooled strand into pellets of the extruded composition;
   drying the pellets at a temperature of 50 to 140° C.; and
   injection molding or extruding the pellets at a temperature of 300 to 380° C. to form an article,
   wherein the article has a haze of less than 5% and a percent transmission above 70% at 3.2 mm according to ASTM D1003-00.

2. The method of claim 1, wherein the transparent polycarbonate article has a haze of less than 0.5% at 3.2 mm according to ASTM D1003-00.

3. The method of claim 1, wherein the crystalline additive has a crystallization temperature (Tc)≥280° C. and a heat of crystallization greater than or equal to 1.0 J/g as determined by differential scanning calorimetry as per ASTM D3418-15.

4. The method of claim 1, wherein the composition includes 0.1 to 10 wt. % of the crystalline additive, wherein the crystalline additive comprises a UV absorbing additive comprising at least one of benzoxazinones, benzotriazoles, or phosphorus-based antioxidants.

5. The method of claim 1, wherein the crystalline additive comprises a benzoxazinone, benzotriazole or a phosphorus-based antioxidant having a molecular weight from 300 to 1500 Daltons.

6. The method of claim 1, wherein the composition includes a colorant comprising at least one of the following: Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse Violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1 or Solvent Yellow 188.

7. The method of claim 1, wherein the composition further comprises at least one mold release agent comprising at least one of $C_6$ to $C_{36}$ pentaerythritol, $C_6$ to $C_{36}$ glycerol esters, or poly alpha olefins with a molecular weight of 300 to 1500 Daltons.

8. The method of claim 1, wherein the extruded composition is cooled with water wherein the cooling water is filtered to less than 5 microns and has a pH 5.5 to 7.0.

9. The method of claim 1, wherein the polycarbonate mixture includes phenolic end groups, wherein the polycarbonate includes less than 50 ppm of phenolic end groups, wherein the polycarbonate includes less than 100 ppm of Cl, wherein the polycarbonate includes less than 100 ppm of Br.

10. The method of claim 1, wherein the article is a transparent sheet, film, lens or optical device.

11. A method to make a transparent polycarbonate article with a thickness of from 1 to 10 mm comprising:
    extruding mixture of 0.1 to 10.0 wt. % of a benzoxazinone, benzotriazole, phosphorus containing anti-oxidant, colorant or any mixtures thereof, at least one of which has a crystalline melting point of greater than or equal to 280° C. and a heat of fusion of greater than or equal to 1.0 J/g and an aggregate average particle size less than 0.5 mm, with 99.8 to 90.0 wt. % of a polycarbonate having a Mw 15,000 to 80,000 Daltons, phenolic end groups content less than 50 ppm, and a moisture content of 0.1 to 5.0 wt. % prior to extrusion in a screw driven melt processing device at 300 to 390° C. wherein the screw is rotating at 250 to 1000 rpm and has a diameter of 20 to 500 mm;

passing the mixture through a die, cooling the mixture to at least 20° C. below the PC Tg and chopping the exudate into pellets having an average size of from 2.0 to 6.0 mm in length where the diameter of the pellet is less than the length; and drying pellets at 50 to 140° C. for at least 1 hr. and injection molding an article at 300 to 380° C. wherein the article, at a thickness of 3.2 mm, has a yellowness index (YI) less than 10, a percent transmittance above 70 and a haze less than 5% wherein the haze is lower than a similar composition made with a benzoxazinone, benzotriazole, phosphorus containing anti-oxidant, colorant or any mixtures thereof, any of which have a crystalline melting point of greater than or equal to 280° C. and a heat of fusion of greater than or equal to 1.0 J/g and an average particle aggregate size greater than 1.0 mm.

12. A method for producing a transparent polycarbonate article, the method comprising:

melting a composition at a temperature of 300 to 390° C., the composition comprising a polycarbonate mixture including a polycarbonate having a Mw of 15,000 to 80,000, a moisture content of 0.1 to 5 wt. % prior to melting, and a $T_g$, and a crystalline additive having a melting point of at least 280° C., a heat of fusion greater than or equal to 1.0 J/g as determined by differential scanning calorimetry in accordance with ASTM D3418-15, and an average diameter less than or equal to 0.5 mm as determined by optical microscopy;

extruding the melted composition to form a strand;

cooling the strand of extruded composition to at least 20° C. below the $T_g$ of the polycarbonate;

cutting the cooled strand into pellets of the extruded composition;

drying the pellets at a temperature of 50 to 140° C.; and injection molding or extruding the pellets at a temperature of 300 to 380° C. to form an article, wherein the article has a haze of less than 0.5% and a percent transmission above 70% at 3.2 mm according to ASTM D1003-00, wherein the composition includes 0.1 to 10 wt. % of the crystalline additive, wherein the crystalline additive comprises a UV absorbing additive comprising at least one of benzoxazinones, benzotriazoles, or phosphorus-based antioxidants, and wherein the polycarbonate mixture includes phenolic end groups, wherein the polycarbonate includes less than 50 ppm of phenolic end groups, wherein the polycarbonate includes less than 100 ppm of Cl, wherein the polycarbonate includes less than 100 ppm of Br.

13. The method of claim 1, wherein the crystalline additive comprises benzoxazinones or benzotriazoles.

14. The method of claim 11, wherein the transparent polycarbonate article has a haze of less than 0.5% at 3.2 mm according to ASTM D1003-00.

15. The method of claim 14, wherein no particles of the crystalline additive have a major axis greater than 1.0 mm.

16. The method of claim 11, wherein no particles of the crystalline additive have a major axis greater than 1.0 mm.

17. The method of claim 1, wherein no particles of the crystalline additive have a major axis greater than 1.0 mm.

18. The method of claim 2, wherein no particles of the crystalline additive have a major axis greater than 1.0 mm.

* * * * *